(12) United States Patent
Dal Monte (10) Patent No.: US 9,265,296 B2
(45) Date of Patent: Feb. 23, 2016

(54) BALANCING SYSTEM FOR THE HEAD OF A PASSENGER OF A VEHICLE, IN PARTICULAR A HELICOPTER

(75) Inventor: Antonio Dal Monte, Rome (IT)

(73) Assignee: B.M.A. Buizza Mazzei Agency S.R.L., Rome (IT)

( * ) Notice: Subject to any disclaimer, the term of this patent is extended or adjusted under 35 U.S.C. 154(b) by 0 days.

(21) Appl. No.: 14/112,854

(22) PCT Filed: Apr. 18, 2012

(86) PCT No.: PCT/EP2012/057089
§ 371 (c)(1),
(2), (4) Date: Oct. 18, 2013

(87) PCT Pub. No.: WO2012/143400
PCT Pub. Date: Oct. 26, 2012

(65) Prior Publication Data
US 2014/0041103 A1  Feb. 13, 2014

(30) Foreign Application Priority Data

Apr. 19, 2011  (IT) .............. RM2011A0197

(51) Int. Cl.
| | |
|---|---|
| A42B 3/04 | (2006.01) |
| A42B 3/08 | (2006.01) |
| B64D 25/04 | (2006.01) |
| B60N 2/44 | (2006.01) |
| B60N 2/02 | (2006.01) |

(52) U.S. Cl.
CPC .............. *A42B 3/0473* (2013.01); *A42B 3/08* (2013.01); *B60N 2002/0208* (2013.01); *B60N 2002/4405* (2013.01); *B64D 25/04* (2013.01)

(58) Field of Classification Search
CPC .......... B64D 10/00; B64D 3/00; B64D 25/02; A42B 3/04
USPC ............................................. 2/421
See application file for complete search history.

(56) References Cited

U.S. PATENT DOCUMENTS

| | | | | |
|---|---|---|---|---|
| 4,711,411 A | * | 12/1987 | Copp ..................... | 244/1 R |
| 4,909,459 A | * | 3/1990 | Patterson ............... | 244/122 AG |
| 4,923,147 A | * | 5/1990 | Adams et al. ......... | 244/122 AG |
| 4,954,815 A | | 9/1990 | Delmonte | |
| 5,267,708 A | * | 12/1993 | Monson et al. ........ | 244/122 AG |
| 5,272,422 A | | 12/1993 | Beaussant | |
| 6,428,043 B1 | * | 8/2002 | Wooten .................. | 280/748 |
| 7,941,873 B2 | * | 5/2011 | Nagely et al. ......... | 2/425 |
| 8,046,846 B2 | * | 11/2011 | Karlsson et al. ...... | 2/421 |
| 2004/0194194 A1 | * | 10/2004 | McNeil et al. ........ | 2/421 |
| 2004/0255368 A1 | * | 12/2004 | Baker .................... | 2/410 |
| 2013/0125296 A1 | * | 5/2013 | Rabinovitch ........... | 2/413 |

FOREIGN PATENT DOCUMENTS

| | | |
|---|---|---|
| FR | 2672565 | 8/1992 |
| WO | WO9813232 | 4/1998 |

* cited by examiner

*Primary Examiner* — Andrew W Collins
(74) *Attorney, Agent, or Firm* — Stetina Brunda Garred & Brucker (57) ABSTRACT

A balancing system for the head of a passenger of a vehicle, in particular a helicopter, comprising a helmet (4) fixed on the head of the passenger and suspension means (100) for the helmet (4) adapted to be connected to a stationary part of the vehicle and to the helmet (4) so as to balance an imbalance of weights on the musculoskeletal system of the neck of the passenger wearing said helmet (4). The system allows maximum freedom without hindering any type of movement to the head of the passenger.

5 Claims, 10 Drawing Sheets

BALANCING SYSTEM FOR THE HEAD OF A PASSENGER OF A VEHICLE, IN PARTICULAR A HELICOPTER

FIELD OF THE INVENTION

The present invention relates to a balancing system of a head of a passenger of a vehicle, in particular a helicopter.

STATE OF THE ART

The arrangement of the head, neck and shoulder muscles makes the task of maintaining the balancing of the head on the neck very hard due to the very short arm with respect to the fulcrum of the head suspension system. This is due to the fact that the cervical vertebra have a structure similar to that of self-supporting cantilever beams, which implies that no other osteomuscular component of the body contributes to supporting the head-neck system in vertical, lateral, oblique and sagittal direction. The work load needed to maintain the head balanced in a position in which vision is horizontal is therefore very high. In order to prevent the head from falling downwards, the human body indeed uses approximately twenty muscles on the right and on the left sides of the neck. In the lateral-rear area of the neck, such small, medium or very large muscles all have the task of contributing, each in proportion to their mass and capacity, to the production of muscular contraction in order to maintain the head in horizontal position. Such muscles are obliged to maintain an isometric force of 25-30 kg in order to maintain the head in horizontal position. Various pathologies to the cervical are found in subjects employed in occupations which force to maintain the head stationary in given positions for a high number of hours a day. The subjects most at risk are video terminal operators, radar operators, musicians, heavy vehicle drivers and, in particular, the drivers of military vehicles, because they are also forced to wear heavy weight protective helmets. In particular, the damage to cervical vertebra of helicopter pilots mainly depend on:
- the high level of vibrations present even in the most sophisticated, modern helicopters capable of producing severe stress on the entire vertebral column, stress which is exacerbated precisely at the cervical level;
- the weight of the helmets of military pilots and of their equipment makes the situation worse because of the additional load (including protective goggles) applied to the head-neck system;
- the further weight of night vision goggles increasingly more frequently used in military operations load which is added to neck muscle fatigue caused by a continuous scanning needed for the limited vision angle of the night vision goggles themselves. Painful neck muscle contractures and pathologies are increasingly more frequent in helicopter pilots who mainly operate in poor light conditions which oblige them to wear heavy night vision goggles. It is known that in order to improve the muscular balancing system of the head a reduction of the contraction force produced by the neck muscles has been experimented by applying to the occipital region a counterbalancing force of only 300-500 grams, compared to the approximately 35 kilograms of force needed to maintain the head in horizontal position. When needing to wear a helmet, for example an integral motorcycle helmet, a counterbalancing weight of approximately 700 g is appropriate. When, however, night vision goggles, which are intrinsically heavy and which overhangingly protrude from the front part of the head must be added in addition to a helmet, there is an additional stress which requires more suitable solutions, also taking into account the fact that the pilot and other crew members, particularly in a fighting helicopter, must have complete freedom of movement of at least the head-neck-upper chest system.

SUMMARY OF THE INVENTION

It is the object of the present invention to provide a balancing system for the head of a passenger of a vehicle, in particular a helicopter, adapted to considerably decrease the force of the cervical muscles needed to support the neck-head whole and further equipment which is made necessary in some operative conditions. It is the object of the present invention a balancing system for the head of a passenger of a vehicle, in particular a helicopter, in accordance with claim 1. A further object of the invention is to provide a balancing method of the head of a passenger of a vehicle, in particular of a helicopter, for reducing the forces of cervical muscles in particular when the passenger is subjected to considerable acceleration and forced to wear a helmet and/or additional equipment fixed to the head. A further object of the invention is to provide a balancing system for the head of a passenger of a vehicle, in particular a helicopter, which is capable of reducing the cervical muscle efforts, while ensuring maximum freedom of movement of the head and of the upper chest part. According to another aspect of the invention, said device is particularly applied to driving vehicles which impress on the head of a passenger, who may be, for example, the pilot, considerable accelerations, possibly also vibrational, above all when the head is further burdened by a helmet and by possible further equipment, such as, for example, night vision goggles or other. The dependent claims describe preferred embodiments of the invention, forming an integral part of the present description.

BRIEF DESCRIPTION OF THE FIGURES

Further features and advantages of the present invention will be apparent in the light of the detailed description of preferred, but not exclusive, embodiments of a balancing system for the head of a passenger of a vehicle, in particular a helicopter, illustrated by way of non-limitative example, with the aid of the accompanying drawings, wherein.

The same reference numbers and letters in the figures refer to the same members or components.

DETAILED DESCRIPTION OF A PREFERRED EMBODIMENT OF THE INVENTION

Figure 1:
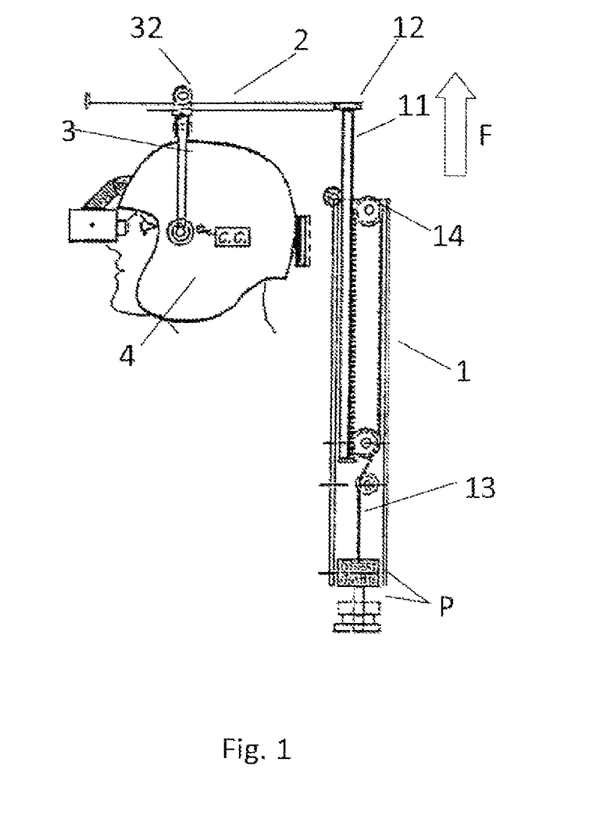
FIG. 1 shows a diagrammatic side view of the system object of the present invention.
Figure 2:
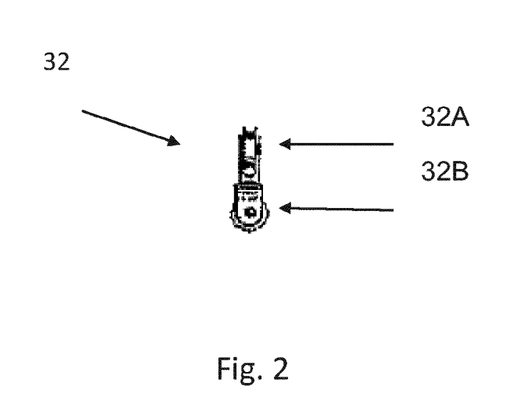
FIG. 2 shows a frontal view of a component of the system in FIG. 1.
Figure 3:
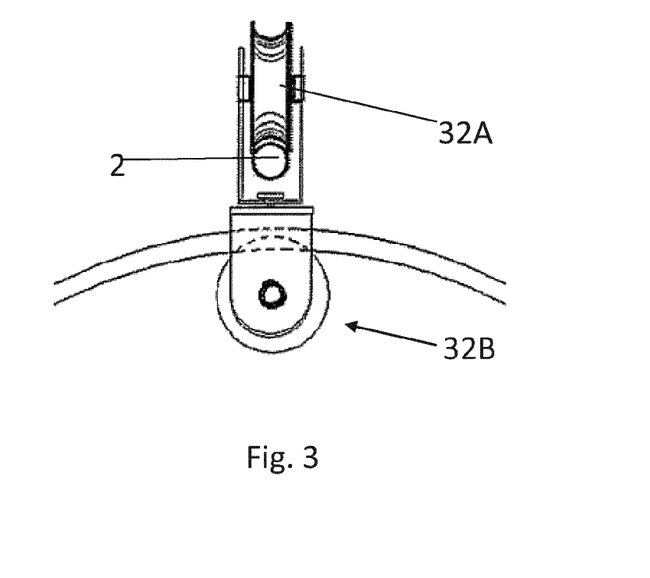
FIG. 3 shows said component of FIG. 2 cooperating with a further component of FIG. 1, FIG. 4 and FIG. 5 show frontally and from the top, respectively, the movement possibilities of the head of a pilot using the system in FIG. 1, FIGS. 6a and 6b show a further embodiment of the invention shown in FIG. 1, with two examples of movements allowed by the device to the pilot.

The present invention, with particular reference to the figures, comprises a suspender 1, preferably adapted to be connected to a stationary part of the vehicle, in the immediate proximity of the passenger's head. Such a suspender 1 may also be defined by a stationary part of the vehicle, preferably immediately behind the passenger's seat backrest. It is preferred that said stationary part of the vehicle is defined by the passenger's seat backrest. Such a suspender 1 comprises a hinge 12 to which a first end of an overhanging element 2 is rotationally fixed, overhanging with respect to the suspender 1, so as to be able to turn on a horizontal plane, preferably over the passenger's head. Therefore, the overhanging element is substantially horizontal and orthogonal to the suspender. Preferably, the hinge 12 is arranged along a sagittal plane of the passenger's seat. The helmet may be provided, as any other helmet, with a belt and buckle for securing the helmet to the passenger's head. According to a first embodiment of the invention (not shown), the helmet 4 is connected by means of a spherical joint to a second end of said overhanging, preferably telescopic element 2, and the suspender is adapted to impress an upward bias to the helmet 4, as represented by the arrow F in FIG. 1, which consequently develops a balancing force of the weight of the helmet 4 and/or of any equipment associated thereto. According to a variant of the invention (not shown in the figures), said joint 3 between helmet 4 and overhanging element 2 is made by means of a spring, preferably made of resilient material, developing a balancing force of the weight of the helmet and/or of the equipment associated thereto in relation to the relative position between the overhanging element and the helmet; being the suspender 1 fixed, i.e. without moveable parts and substantially monolithic or coinciding with said stationary part of the vehicle. According to another variant of the invention, shown in the figures, said joint between helmet 4 and overhanging element 2 is made by means of a body adapted to transmit traction force only, for example a rope, while the suspender 1 is devised to push upwards according to the arrow F, by means of a moveable part 11 thereof, the overhanging element 2, which consequently transmits the balancing force of the weight applied to the passenger's neck. More particularly, according to a variant of said embodiment with suspender 1 having moveable part 11, said suspender 1 is telescopic and provided, for example with a torsion spring. According to another embodiment, instead, said suspender 1 is made by means of a telescopic device, in which a moveable part 11 is pushed upwards by means of a counterweight P connected to a lower part of the moveable part 11 by means of a cable 13, and at least one jockey pulley 14 of the cable, so as to convert a downward movement of the counterweight P into an upward movement of the moveable part 11.

Figure 8:
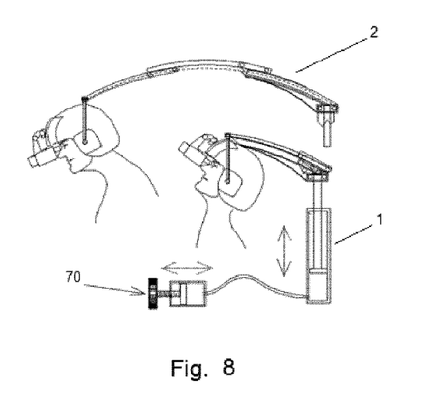
FIG. 8 shows a variant for obtaining an upwards bias of the device to support the weight of the helmet.

Another variant using a counterweight or elastic system for obtaining the upward bias of the supporting device of the weight of the helmet and of the night vision goggles is shown in FIG. 8. This is a pneumatic system of the bicycle pump type. The bias adjustment of this solution is made by means of an actuator 70, also pneumatic, with piston moveable by means of a screw knob and capable of varying the air pressure in the piston 1 which acts directly on the helmet suspension system.

Figure 4:
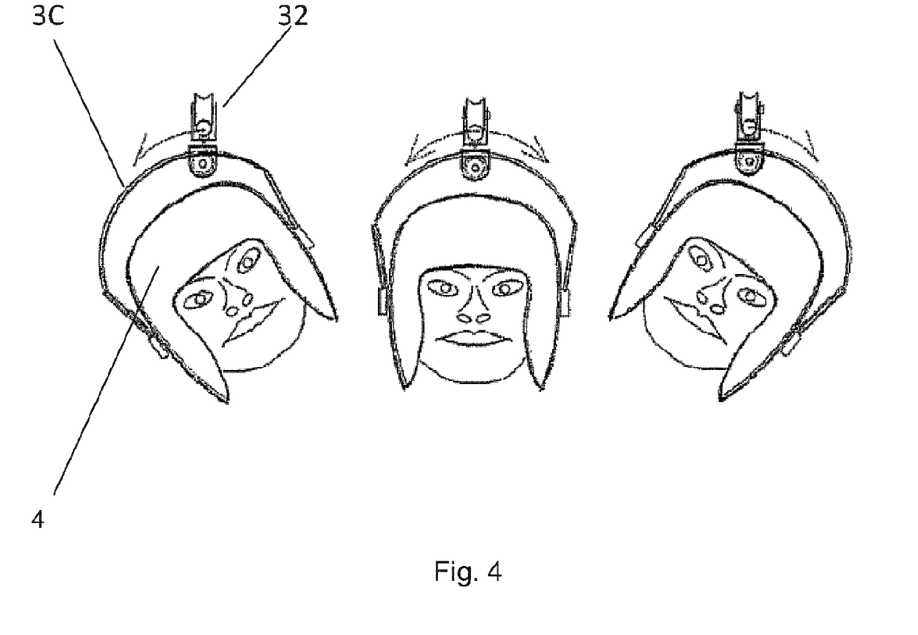
Figure 5:
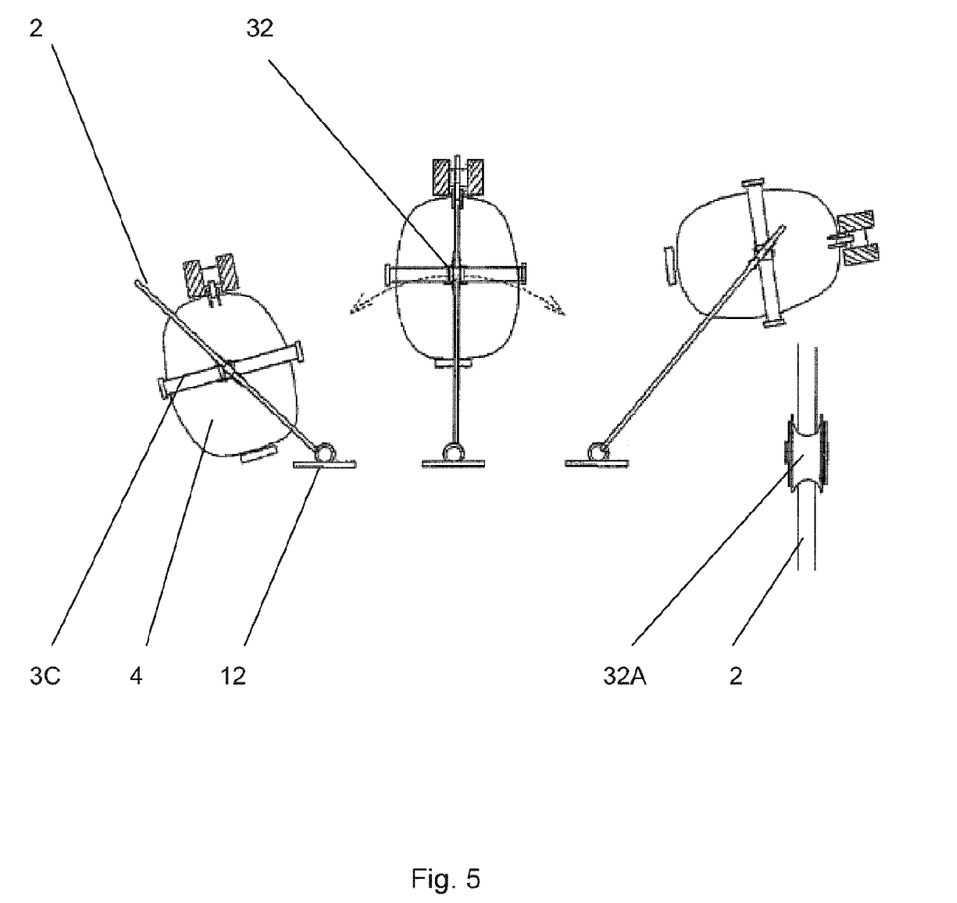
Figure 9:
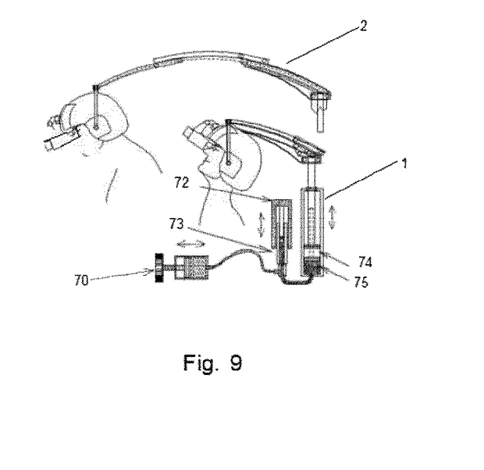
FIG. 9 shows another embodiment of the same device.

In the embodiment in FIG. 9, the system of the invention is integrated by a hydraulic system so as to constitute a hydraulic-pneumatic device which is used to adapt the lifting bias of the helmet to the pilots' heights and their personal preferences, but also to the variations of the force of gravity G which occur during flight maneuvers and by effect of air turbulence. In FIG. 9, reference numeral 72 indicates a weight which pushes a hydraulic piston 73 for recovering variations of the force of gravity G, and reference numerals 74 and 75 indicate air and hydraulic oil, respectively. The variant of the system of the invention which includes the counterweight P is the most advantageous because the balancing force F is constant independently from the reciprocal position between the helmet 4 and said stationary part to which the suspender 1 is connected. Furthermore, the balancing force F may be easily calibrated according to the personal preference of the pilot/passenger without needing to vary the height of the overhanging element 2. Indeed, especially in vehicles such as aircraft and helicopters, the space available to passengers is extremely small. Furthermore, advantageously, possible accelerations equally reverberate on the helmet 4 and on the weight P, determining that the two remain in constant mutual balance, regardless of the stress impressed on the vehicle. Other variants may be obtained as a combination of all the previous variants described above. The device described herein behaves like a crane with regards to the helmet which however has the purpose of reducing the weight loading the neck muscles instead of moving its load. Furthermore, it is desirable for the device not to interfere with the natural movements of the head. For this purpose, preferably, the overhanging element 2, which has a substantially elongated shape, allows the connection point to slide along said elongated direction, i.e. to move towards the hinge 12 or away from it, so as to be able to cover, by virtue of the presence of the hinge 12, any point of a half plane identified by the passenger's seat backrest. In other words, the overhanging element 2 may be considered as a polar axis. Thus, as described above, it may be telescopic, or according to an embodiment shown in the figures, said overhanging element 2 is a rigid rod. When the overhanging element is a rigid rod, the joint 3 comprises a system of pulleys 32 having a first pulley 32A and a second pulley 32B both having respective vertical rotation planes about respective fulcrums. Furthermore, they are rotationally restrained to each other according to a horizontal plane, intermediate between the two, so that the respective vertical rotation planes about the fulcrums may assume different mutual angles. The first pulley 32A works on the rod 2, while the second pulley 32B works on an arch 3C: the arch hangs from the pulley 32B. The arch 3C has two opposite ends connected to the helmet in two symmetric points with respect to a sagittal plane of the helmet 4. Such points are identified so as to compensate for an imbalance induced by a possible equipment associated to the helmet, such as night vision goggles or other, and to compensate for a natural imbalance of the cranium. With reference to FIGS. 4 and 5, such a solution allows the passenger's head to move on the aforesaid half plane, but also to be inclined rightwards or leftwards according to a rolling movement, and additionally to be able to perform rotary-translation movements with respect to the hinge 12, composed by rightwards and leftwards rotations and inclinations.

Figure 6:
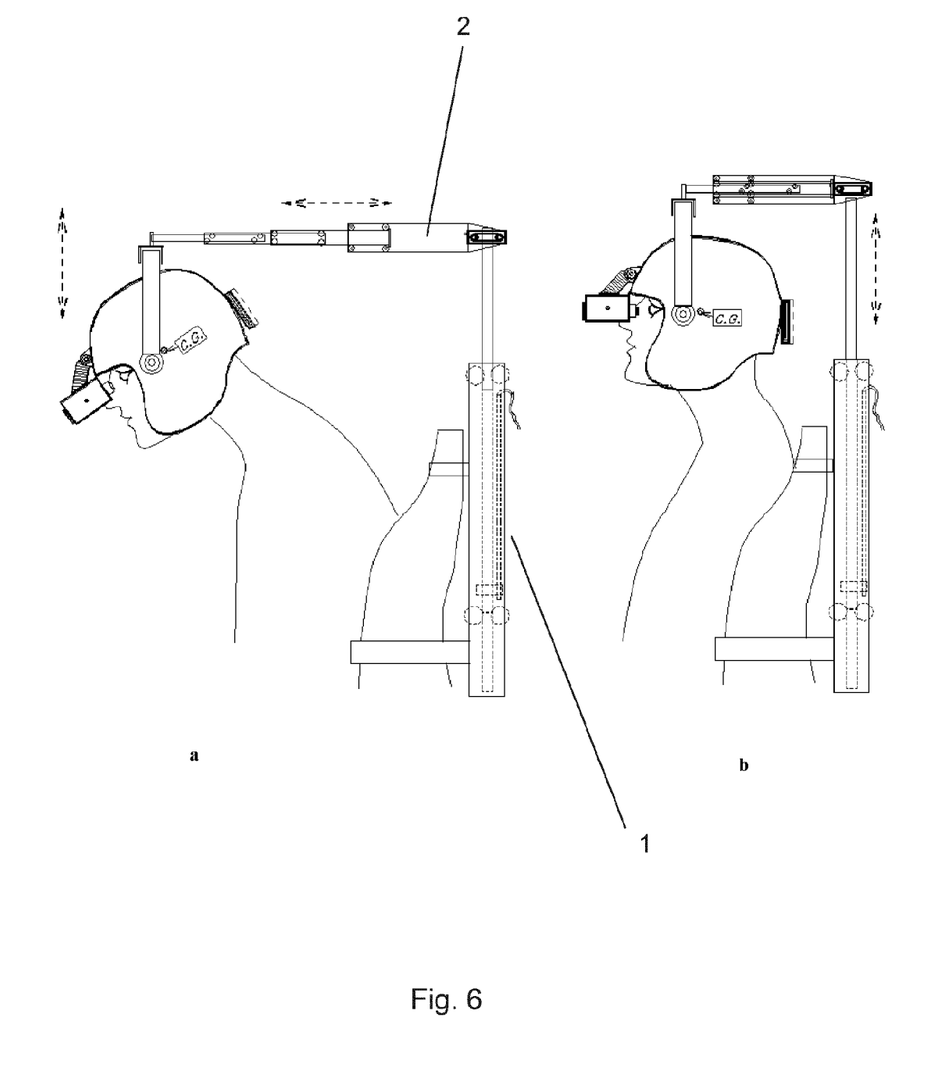

FIG. 6 shows a further embodiment in which the suspender and the overhanging element 2 are both telescopic. In this embodiment, for example, the helmet is hung from the overhanging element by means of an arch/pulley system, already previously described above, but could also be connected by means of a spherical joint, as in the first described embodiment.

Figure 7:
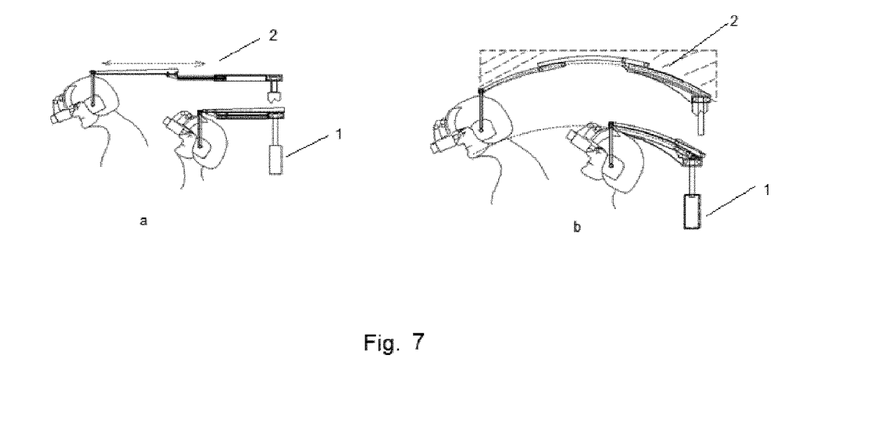
FIGS. 7a and 7b show a comparison of the rectilinear and curvilinear dynamic variants.

FIGS. 7a and 7b show another embodiment, particularly adapted to be used on helicopters, in which the overhanging arm 2 may have a curvilinear shape, again with a telescopic elongation. The base of the arch moves always on a substantially horizontal plane, orthogonal to the suspender 1. The system takes into account the dimension situations within the cockpit of any type of helicopter for military or civilian use, and was mainly studied to allow a reduction of the volume occupied by the system. The curvilinear guiding system to which the helmet is fixed must allow the head, when wearing the helmet, to turn on the transversal plane and to bend laterally to the anatomic limits of neck articulations. The suspension system fixed to the helmet may be automatically detached in case of accelerations higher than those predictable for metrological turbulence, and thus presumably caused by accidents. In case of detachment of the device, this must be arranged automatically behind the head and not constitute an obstacle to possible evacuation from the aircraft.

Figure 10:
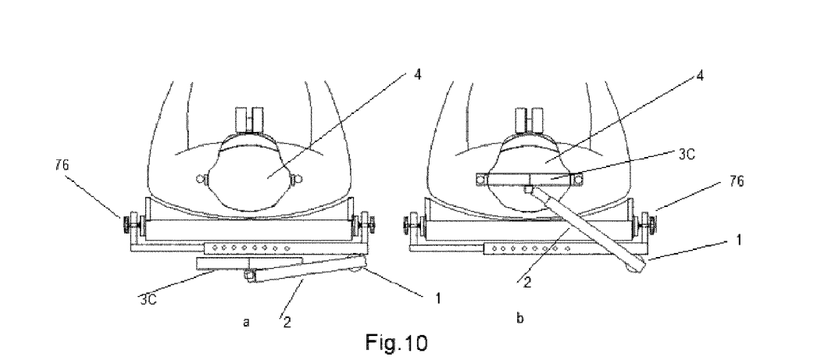
FIGS. 10a and 10b show a top view of an example of assembly of the device, engaged and disengaged.

FIG. 10 shows a preferred embodiment which does not exclude the others, wherein the suspension system is fixed onto a side of the backrest, thus responding to the need of avoiding visual impediments to other crew members sitting in tandem, as in fighting helicopters. The side arrangement of the suspension system at the transversal wall of the backrest also derives from the need to allow a rational storage of the suspension system when it is detached from the helmet and to prevent any part of the device of the invention from constituting a hindrance to the vision of a crew member sitting behind. The fastening system of the entire device consists of elements which do not alter the structure of the seat, such as holes, welding or other, in any manner. FIG. 10 shows, by means of non-exclusive example, a pressure system 76 with fastening of a macrometric pressure pad system applied with screw system. The suspension system fixed to the helmet may be automatically detached in case of accelerations higher than those predictable for metrological turbulence, and thus presumably caused by accidents. In case of detachment, the device is arranged automatically behind the head so as to not constitute an obstacle to possible evacuation from the aircraft. The automatic detachment system preferably consists of a passive mechanical type device, without in all cases excluding electromagnetic or simply magnetic type systems. The advantages deriving from the application of the present invention are apparent. One of the features of this system for helicopters is to ensure maximum freedom of movement of the pilot's head in space without any restriction of the pilot's movement or of other passengers wearing a helmet associated to the system of the invention, with the sole objective of protecting anatomical structures from fatigue caused by very high stress operating conditions. In particular, the load sustained by the neck muscles is reduced or cancelled out by means of the variants of the system described above. The system allows all the movements necessary for the pilot's work in a helicopter and, appropriately adapted, compensates for any use of equipment connected to the helmet or in all cases to the passenger's head in addition to the weight of the head itself.

The elements and features illustrated in the various embodiments may be combined together without therefore departing from the scope of protection of the invention.

The invention claimed is:

1. A balancing system for a head of a passenger transported in a vehicle, in particular a helicopter or aircraft, comprising:
   a helmet configured to be fixed to the head of the passenger,
   suspension means for the helmet adapted to be connected to a structure of the vehicle and to the helmet so as to balance an imbalance of weights on a musculoskeletal system of a neck of the passenger wearing said helmet, said suspension means comprising
   a suspender, configured to be fixed to said structure,
   a telescopic overhanging element, having a first end and a second end, adapted to be positioned over the head of the passenger and, extending essentially horizontally on a plane substantially orthogonal to the suspender,
   a joint connecting the overhanging element to the helmet,
   a hinge connecting the first end of the overhanging element to the suspender, so that the second end can rotate on an essentially horizontal plane essentially orthogonal to the suspender,
   wherein said suspender is of the telescopic type, provided with a movable part adapted to impart an upward force to said telescopic overhanging element and, thus, to the helmet, in order to develop a balancing three of the weight of the helmet,
   wherein there is provided a pneumatic device for applying an upward bias to said movable part by means a first piston,
   wherein there is provided a pneumatic actuator with a second piston moveable and capable of varying the air pressure on the first piston, in order to adjust said upward bias,
   and wherein said telescopic overhanging element has a curvilinear shape, whereby said overhanging element, while extending telescopically, describes an arch on a plane comprising the suspender and the telescopic overhanging element, in order to reduce the volume occupied by the system.

2. The system according to claim 1, wherein the base of the arch can move in an essentially horizontal plane orthogonal to the suspender.

3. A helicopter comprising a balancing system for the head of a passenger according to claim 1, wherein the balancing system is fixed to the backrest of a seat.

4. An aircraft comprising a balancing system for the head of a passenger according to claim 1, wherein the balancing system is fixed to the backrest of a seat.

5. A balancing system for a head of a passenger transported in a vehicle, in particular a helicopter or aircraft, comprising:
   a helmet configured to be fixed to the head of the passenger,
   suspension means for the helmet adapted to be connected to a structure of the vehicle and to the helmet so as to balance an imbalance of weights on a musculoskeletal system of a neck of the passenger wearing said helmet, said suspension means comprising
   a suspender, configured to be fixed to said structure,
   a telescopic overhanging element, having a first end and a second end, adapted to be positioned over the head of the passenger and extending essentially horizontally on a plane substantially orthogonal to the suspender,
   a joint connecting the overhanging element to the helmet,
   a hinge connecting the first end of the overhanging, element to the suspender, so that the second end can rotate on an essentially horizontal plane essentially orthogonal to the suspender,
   wherein said suspender is of the telescopic type, provided with a movable part adapted to impart an upward force to said telescopic overhanging element and, thus, to the helmet, in order to develop a balancing force of the weight of the helmet,
   wherein there is provided a pneumatic device for applying an upward bias to said movable part by means a first piston,
   and wherein there is provided a pneumatic actuator with a second piston moveable and capable of varying the air pressure on the first piston, in order to adjust said upward bias.

* * * * *